United States Patent [19]

Jahn

[11] 4,061,486

[45] Dec. 6, 1977

[54] PROCESS FOR THE MANUFACTURE OF OPTICAL BODIES WITH REFRACTIVE INDEX GRADIENTS

[75] Inventor: Walter Jahn, Ingelheim, Germany

[73] Assignee: JENAer Glaswerk, Schott & Gen., Mainz, Germany

[21] Appl. No.: 659,258

[22] Filed: Feb. 19, 1976

[30] Foreign Application Priority Data

Feb. 19, 1975 Germany .............................. 2507069

[51] Int. Cl.$^2$ ....................... C03B 23/20; C03C 15/00
[52] U.S. Cl. ........................................... 65/18; 65/22; 65/30 R; 65/31; 65/60 D; 65/DIG. 7; 156/663
[58] Field of Search ........ 65/31, 30 R, 60 D, DIG. 7, 65/18, 22; 156/24

[56] References Cited

U.S. PATENT DOCUMENTS

| | | | |
|---|---|---|---|
| 3,149,946 | 9/1964 | Elmer | 65/31 X |
| 3,485,687 | 12/1969 | Chapman | 65/31 X |
| 3,647,583 | 3/1972 | De Rouw | 65/31 X |
| 3,785,793 | 1/1974 | Park | 65/31 |
| 3,792,987 | 2/1974 | Eaton | 65/31 |
| 3,873,344 | 3/1975 | Church et al. | 65/60 R |
| 3,938,974 | 2/1976 | Macedu et al. | 65/DIG. 7 |

FOREIGN PATENT DOCUMENTS

| | | | |
|---|---|---|---|
| 29,158 | 8/1971 | Japan | 65/31 |
| 189,988 | 12/1967 | U.S.S.R. | 65/31 |

*Primary Examiner*—S. Leon Bashore
*Assistant Examiner*—Frank W. Miga
*Attorney, Agent, or Firm*—Littlepage, Quaintance, Murphy, Richardson & Webner

[57] ABSTRACT

The invention provides a process for producing a transparent optical-glass body having a linear index of refraction gradient. Particles of optical glass which contain leachble ingredients are pressed to form a self-supporting porous optical glass body. Some of the leachable ingredient is leached from a part of the porous glass, and a different amount is leached from a second part of the porous glass, the index of refraction varying in proportion to the different amounts leached from the glass body. The porous optical glass body is heated to eliminate the pores. Various means for effecting the different amounts of leaching over the length of the glass body are shown.

6 Claims, No Drawings

PROCESS FOR THE MANUFACTURE OF OPTICAL BODIES WITH REFRACTIVE INDEX GRADIENTS

Optical glass with refractive index gradients serve a wide area of interesting technical uses. They can for example be in the form of glass rods which describe a symmetrical rotation refractive index gradient which receive in the rod axis in radial directions. Such gradient rods (rod lenses) are of interest for medical optic use (endoscope). Additionally it is possible to manufacture fibers from such rods which by the presence of a particular refraction profile find use in the signalling technical industry. Production of gradient rods are described for example according to the German patent Dt-OS 2,263,501 by means of ion exchange processes.

A gradient fiber is described in the German patent Dt-AS 1,901,053. In this patent an ion exchange of a lithium oxide containing glass is accomplished by means of a salt-melt in a specialized temperature range inside a thin surface zone.

Light guiding glass bundles arranged in a glass matrix of a lower refractive index and with continuously refractive index gradients between the light guide and the matrix are described in the German patent Dt-PS 2,039,239.

The processes as mentioned have refractive index gradients which extend from their maximum to their minimum values over a very small span. This means that the usual thin glass rods and fibers are less than a millimeter. In principle it is possible to extend this distance by a few millimeters. In order to accomplish that extension very long temperature times are needed in order for diffusion (for example ion exchange in a salt melt) to achieve a refractive index gradient inside of a span of possibly 5-10 millimeters. The achieved refractive index difference lies mostly in the area of the third decimal after the period if sodium, lithium, or potassium ions are used as the exchange ions. With the introduction of thallium ions it is possible to reach the second decimal.

Small gradient spans by the use of the usual diffusion and exchange processes limits these processes for the manufacture of gradient fibers and rods to a small diameter. An additional disadvantage of these known processes is the relatively small refractive index difference which it is possible to attain. The use of the thallium ion to achieve a greater refraction difference presents an aggravating condition for the process of manufacture because of the poisonous nature of the thallium.

Therefore it is highly desirable to achieve a refractive index gradient which extends over a greater expanse so that for example optical elements with a diameter of 30 or 40 millimeters and thereabouts can be manufactured. Such elements would for example find use for correction of known peripheral picture distortions or would make possible a reduction of the lens in photo objective lenses. Employment of a symmetrical rotation gradient would even make a linear directed gradient useful. Bifocal or trifocal glasses could be achieved without interfering refractive index flaws by the use of gradient spectacles ("slide side"). "Slide side" spectacles without refraction flaws are, to be sure, known; their manufacture, without recourse to a refractive index gradient involves a very complicated forming of the glass.

The object of the present invention is therefore a gradient glass whose refractive index value is continuously changing over a wide expanse. According to this invention the objective is achieved by means of a process which is characterized in that a porous glass article is manufactured which porous glass article achieves a refractive index gradient by means of a leaching gradient through solubilizing agents and/or by means of a penetration gradient with refractive index changing substances and subsequent vitrifying and tempering. By this means a compact transparent glass article is achieved whose refractive index value is continuously changing, such change corresponding to refractive index changes according to the leaching and/or penetration in these glass articles. According to one method of carrying out the process according to the invention a porous glass article is achieved by means of a solubilizing agent variously leaching to produce a soluble gradient and finally producing a transparent glass article vitrifyed and tempered. According to the degree of this variable leaching, for example, through an acid treatment in which, more or lesser gross quantities of acid, soluble materials can be leached from the glass; subsequently following with vitryfying and tempering a compact glass article of varying compositions and thereby varying refractive index values is attained. The leachable ingredient is an alkali metal oxide.

According to another means of carrying out the invention a porous glass can be penetrated with refractive index values varying penetrating substances so that a concentration drop occurs and a transparent glass article produced which is then vitryfied and tempered. The penetration can for example occur by dissolving in a refraction changing substance or by suspending in a fluid or gas medium or in a molten form by means of a penetration gradient which is allowed to diffuse into the porous glass article. Through vitrification a compact transparent glass article is achieved with continuously changing composition and thereby varying refractive index values. Particularly according to this second method it is possible to achieve relatively large refractive index value differences. Penetration with special polyvalent cations which strongly contribute to the change of the refractive index values, is highly desirable.

According to a third means of practicing the invention a porous glass article can first be variously leached and then effecting a concentration drop with refractive index changing substances by penetrating means and finally for the production of a transparent glass body vitrifying and tempering. This final process is a combination of the first two processes. It serves the purpose to influence the refractive gradients by two different processes one after the other to strengthen or even through the superimposing of leaching and penetrating means to influence various materials of differing properties or disadvantageous property coupling. For example it is possible with the leaching particularly to remove the lightly soluble components from the porous glass material, particularly the alkali oxides. On the other hand through saturation subsequently desireable ions can be brought into the leached porous glass article. For example, the heat expansion through addition of desired materials can be compensated or the changing Tg can be corrected. The gradient of leaching and penetration can thereby in simultaneous or opposite directions be used however one wishes to combine the properties.

After the vitrification can the leached as well as the penetrated glass article be subjected to a tempering for the attainment of the concentration equilibrium through diffusion in the area of the original crystal diameter or pore volume.

Among porous glasses included here are glasses which are covered with small cells which are connected with each other. Such bodies can also through sintering of the glass powder as well as through leaching and thermal manipulation achieve particular compact glasses (for example the Vycor type).

The various leaching means for accomplishing a leaching gradient can be carried through by a great many methods. For example, a porous glass rod can have one end introduced in a leaching fluid such as dilute nitric acid. The fluid rises up the hole according to capillary action. After suitable reaction time one has achieved between the two ends a leaching gradient. The simple arrangement can be varied and worked in many ways. Also the leaching fluid can be moved or directed in a stream. The contacting rod or any other formed body can be rhythmically raised and lowered to increase the gradient. The course of this movement can be so arranged mechanically as to influence the course of the refractive index value gradient. To increase the gradient and leaching the leaching fluid can additionally be used at a higher temperature. A similar effect is reached if the porous glass body shows a temperature gradient during the leaching, whereby in the area of higher temperatures a stronger or faster leaching takes place.

The non-uniform leaching is effected by contacting a leaching agent with differing portions of the porous optical-glass body for a differing times. The non-uniform leaching is effected by withdrawing the porous optical-glass body from a leaching solution over a period of time.

The index of refraction may vary directly or inversely as the concentration of the leachable ingredient in the composition of the optical-glass.

Another possibility consists in sintering a pressed quantity of powdered glass by means of applying a temperature gradient before the leaching. Owing to the various pore volumes of the sintered body through different shrinkages then an even different leaching results.

Several of the methods described here can be combined for an increased effect. A sintered porous glass rod, which by means of the application of a temperature gradient, owing to the different sinter grades and the differing pore volumes resulting therefrom, thus has a somewhat conical form, can instead of a liquid leaching fluid be treated with a molten salt as leaching medium at a raised temperature. The medium can be so chosen that besides leaching also additional components of the glass can be removed. Such melts can, for example, be water-containing (molten with included water of crystallization) or water free.

Penetration of a porous glass body under the influence of a concentration gradient with reference to the removed material can succeed according to the same, similar or varied methods as previously described. For penetration water solutions, water containing or water-free melts can be used. The substances in the glass which are to be converted should for the sake of expediency be in a form which is suitable for the subsequent sintering in the porous glass. For water solutions serve, besides silica gel, for example the soluble solutions of halides, nitrates and carbonates of suitable metals. These metal salts are also used in the molten form. Besides the named inorganic compounds, organic metal compounds are used which give the desired metal oxide after thermal reaction. The penetration of porous glass bodies by means of intended solutions, suspensions or molten materials can be aided by application of an electrical field.

The glass articles achieved by leaching or penetration or both methods are finally subjected to a suitable temperature treatment in order to convert the material introduced into the matrix and to vitrify the glass article. Note also that before the suitable vitrification water or organic solutions introduced with the leaching and/or penetration are removed by suitable temperature treatments. The same is true for the thermal decomposition deposited salt molecules and the removal of the decomposition products. Tempering under application of a vacuum accelerates the removal of the solution remnants and gaseous decomposition products.

A glass article with a continuously varying refractive index value is manufactured from a porous glass body. The body is leached by means of a leaching gradient through soluble means and/or penetrated by means of a penetration gradient with substances capable of altering the index of refraction. Thereafter, the glass body is vitrified and tempered so that a compact, transparent glass article results whose index of refraction continuously changes corresponding to the changes produced by inhomogenous leaching and/or inhomogenous penetration in the glass article. A leaching gradient can be achieved by a continuously changing action of the leaching solution over a period of time. The leaching gradient can be achieved by means of a continuously changing pore distribution, which, for example is achieved by application of a temperature gradient during the manufacture of the porous article. The penetration gradient may be achieved through a continuously changing action of the penetration medium over a period of time. The penetration gradient may be achieved by means of a continuously changing pore distribution, which, for example, has been achieved by the application of a temperature gradient during the manufacture of the porous article.

The vitrification occurs preferably at a temperature, at which the glass has a viscosity between about $10^5$ and $10^8$ poise. The length of tempering depends on the viscosity of the glass, on the temperature employed, as well as the intended use on whether the sintering occurred under normal atmospheric pressure or vacuum, on the use of a protective gas, and so forth.

After the vitrification, directly or indirectly a tempering finally takes places, which continues or strengthens the diffusion equilibrium which partially took place during the vitrification between the partially through leaching and/or penetration weakened or enriched thin glass layer with the original glass. This is done until the required result is achieved for the optical purpose in mind. Vitrification and diffusion for the diffusion equilibrium can also be combined into a single temperature treatment. The smaller the grain size of the porous glass or the pore diameter and the more evenly spaced the pores are the more complete is diffusion equilibrium in the micron area. The diffusion equilibrium can be accelerated or the time of sintering shortened, if the viscosity through a temperature increase is correspondingly lowered as long as the dimensions and geometry of the glass article or an intended device which hinders an undesired deformation, permits this. The upper temperature limit lies at the point, at which the convection of the desired glass diminishes the refractive index gradient in an undesirable amount.

According to a preferred embodiment of the present invention there is provided a process for producing an optical-glass body having an index of refraction gradient. This process comprises the steps of leaching and then vitrifying. The first step is non-uniformly leaching a leachable ingredient from a porous-optical-glass body wherein the index of refraction of the porous optical-glass body is a function of the concentration of the leachable ingredient in the composition of the optical glass. The second step is vitrifying the porous body to remove the pores thereby producing a transparent optical-glass body having an index of refraction gradient corresponding to the composition of the optical glass. The preferred leachable ingredient is an alkali metal oxide such as $K_2O$ or $Na_2O$. The preferred leaching agent is an aqueous leaching solution containing an acid such as citric acid.

In its broadest aspects the present invention is applicable to any optical glass having a leachable ingredient however it can advantageously be applied to optical glasses having the following composition in percent by weight:

|  | Broad | Preferred |
|---|---|---|
| $SiO_2$ | 10 to 50 | 20 to 40 |
| $R_2O$ | 2 to 30 | 5 to 20 |
| $B_2O_3$ | 0 to 5 | 0 to 5 |
| $Al_2O_3$ | 0 to 5 | 0 to 5 |
| PbO | bal. essentially | bal. essentially | wherein R is an alkali metal.

The vitrifying can be effected at any temperature sufficiently high to cause the particles to coalesce and which causes elimination of the pores in the porous glass body. However the vitrifying is preferably effected by heating the porous glass body to a temperature of 550° C to 700° C. Although the heating can be conducted in air it is generally conducted at subatmospheric pressures and preferably at pressures at $10^{-1}$ torr. Following vitrifying it is sometimes advantageous to subject the glass to a separate heating step in order to temper the optical glass body.

The invention will be further clarified by the following examples.

EXAMPLE 1

By means of a known processes, leached glass of the Vycor type with continuous pores is made, measuring $20 \times 10 \times 1$ mm. The polished dry glass is supported by means of a holding device with the small side of the glass plate vertical in a liquid impregnating solution (16.9 g lead nitrate, 2.2 g sodium nitrate and 2.6 g potassium nitrate; dissolved in 100 ml of water) at 20° C. The depth of immersion is 5 mm. After a reaction length of 20 minutes the glass plate is removed from the solution; dried for about 1 hour at 60° C and finally at 120° C in a drying enclosure, after which the glass is brought into an electrically heated oven for about 3 hours at a temperature of 720° C and maintained at this temperature for 24 hours. After cooling the glass from the oven, sometimes a two-sided over-polishing of the glass plate follows. From the clear transparent glass can be cut from both end areas (top and bottom) as well as from the middle a small glass section $4 \times 4$ mm and the average refractive index $n_d$ can be measured by means of the Abbe' spectrometer.

| Refractive index: | lower end of plate | $n_d = 1.463$ |
|---|---|---|
| | middle | $n_d = 1.461$ |
| | upper end | $n_d = 1.459$ |

The refractive index gradient show along a 16 mm length a value for $\Delta n$ of 0.004.

EXAMPLE 2

An optical glass of the following composition (% by weight)

| $SiO_2$ | 34.0 |
|---|---|
| PbO | 53.8 |
| $Na_2O$ | 4.0 |
| $K_2O$ | 7.4 |
| $B_2O_3$ | 0.8 | was broken, ground and sifted. The sifted fraction containing particles of a size between 60 and 100 microns was formed under a pressure of 500 kg/cm into a self-supporting porous glass body which measured $20 \times 20 \times 5$ and finally was sintered at a temperature of 600° C which did not result in any substantial reduction in the porosity of the body. The lightly contracted sintered body, thusly attained, which possesses continuous pores, is subsequently partially leached. This is done by means of a solution which contains dissolved in 1000 ml of water 37 g $Na_2HPO_4$ and 10 g of citric acid. The sintered body is contacted with the solution vertically by means of a clamping device so that the fluid level stands at the upper edge of the sintered body. The solution is warmed to 70° C and the temperature held constant during the leaching process by means of a thermostat. The fluid level will evenly sink, so that after a course of 120 hours the fluid level has sunk to the lower edge of the sintered glass. After 24 hours the leached out products are washed away with water, the sintered body is subsequently dried and for vitrification is heated in a vacuum at $10^{-4}$ torr for 60 minutes at 580° C. Subsequently a temperature of 560° C is maintained for 15 hours in an electric oven at normal atmospheric pressure and finally the grinding and polishing of the glass to a thickness of 2 mm. The end product shows a few fine bubbles (lack of constant temperature at the vacuum sintering). Results:

| Refractive index | lower end of plate | $n_d = 1.582$ |
|---|---|---|
| | middle | $n_d = 1.587$ |
| | upper end | $n_d = 1.592$ |

The refractive index gradient shows over a length of about 14 mm a value for $\Delta n$ of 0.010.

EXAMPLE 3

A pressed body measuring $20 \times 10 \times 5$ mm, composition and preparation according to Example 2 was sintered by means of a temperature gradient of 30° C. The temperature in the gradient-oven measured at the long end of the pressed body was about 620° C preferably 590° C. The slightly pyramidal, contracted sintered body (length of sintering, 30 minutes) was after cooling for 96 hours suspended in a leaching solution according to Example 2, but without the sinking of the leaching solution; followed by a drying, sintering in vacuum and preparation to a thickness of 2 mm thickness according to Example 2. The end product showed a few fine bubbles.

Results:

| Index of refraction | wider end of plate | $n_d = 1.582$ |
|---|---|---|
| | middle | $n_d = 1.586$ |
| | smaller end | $n_d = 1.590$ |

The index of refraction gradient shows over a length of about 14 mm a value for $\Delta n$ of 0.008.

The composition of the optical glass contains the leachable ingredient and the optical glass has the property of varying the index of refraction as a function of the amount of the leachable ingredient. A first portion of the leachable ingredient is leached from a first part of the porous body and a second portion of the leachable ingredient is leached from a second part of the porous optical-glass body. The first portion is greater than the second portion and the leaching is non-uniform. When the pore sizes are non-uniform, the non-uniform leaching can be effected by contacting of the porous optical-glass body with a leaching agent of uniform concentration and uniform temperature.

What is claimed is:

1. A process for producing a transparent optical-glass body having an index of refraction gradient, said process comprising the steps of:
   I. pressing particles of optical glass to form a self-supporting porous body of optical glass of the following composition by weight percent:

| $SiO_2$ | 10 to 50 |
|---|---|
| $R_2O$ | 2 to 30 |
| $B_2O_3$ | 0 to 5 |
| $Al_2O_3$ | 0 to 5 |
| PbO | balance to make 100% | wherein R is an alkali metal,
   II. sintering the body without substantially reducing the porosity,
   III. immersing the body in a leaching solution,
   IV. applying a temperature gradient over the body in the leaching solution, wherein the leaching of the $R_2O$ from the area of higher temperatures is stronger or faster than the leaching of $R_2O$ from the area of lower temperatures,
   V. heating the porous optical-glass body to a temperature of 550° to 700° C to eliminate the pores and give a transparent optical-glass body having an index of refraction gradient such that the index of refraction in the area of lower temperatures is greater than the index of refraction in the area of higher temperatures.

2. A process for producing a transparent optical-glass body having an index of refraction gradient, said process comprising the steps of:
   I. pressing particles of optical glass to form a self-supporting porous body of optical glass of the following composition by weight percent:

| $SiO_2$ | 10 to 50 |
|---|---|
| $R_2O$ | 2 to 30 |
| $B_2O_3$ | 0 to 5 |
| $Al_2O_3$ | 0 to 5 |
| PbO | balance to make 100% | wherein R is an alkali metal,
   II. sintering the body without substantially reducing the porosity,
   III. leaching a first portion of the $R_2O$ from a first part of the porous body and leaching a second portion of the $R_2O$ from a second part of the porous optical-glass body wherein the first portion of the $R_2O$ leached is greater than the second portion of $R_2O$ leached,
   IV. immersing inhomogeneously the porous optical glass body in a penetrating medium containing cations,
   V. continuously changing the action of the penetrating medium over a period of time so that a first part of the optical glass is penetrated by cations to a greater extent than a second part of the optical glass,
   VI. heating the porous optical-glass body to a temperature of 550° to 700° C to eliminate the pores to give a transparent glass articles such that in the part of the glass body penetrated for a longer time with cations from the penetrating medium the refractive index is greater than in the glass body penetrated with cations for a lesser time.

3. A process for producing a transparent optical-glass body having an index of refraction gradient, said process comprising the steps of:
   I. pressing particles of optical glass to form a self-supporting porous body of optical glass of the following composition by weight percent:

| $SiO_2$ | 10 to 50 |
|---|---|
| $R_2O$ | 2 to 30 |
| $B_2O_3$ | 0 to 5 |
| $Al_2O_3$ | 0 to 5 |
| PbO | balance to make 100% | wherein R is an alkali metal,
   II. sintering the body without substantially reducing the porosity,
   III. applying a temperature gradient to change continuously the pore distribution,
   IV. immersing the body into a leaching solution, and
   V. heating the porous optical-glass body to a temperature of 550°–700° C to eliminate the pores and give a transparent optical glass body having an index of refraction gradient such that the part with a higher temperature has a higher index of refraction than the part with a lower temperature.

4. A process for producing a transparent optical-glass body having a linear index of refraction gradient, said process comprising the steps of:
   I. pressing particles of optical glass to form a self-supporting porous body of optical glass of the following composition by weight percent:

| $SiO_2$ | 10 to 50 |
|---|---|
| $R_2O$ | 2 to 30 |
| $B_2O_3$ | 0 to 5 |
| $Al_2O_3$ | 0 to 5 |
| PbO | balance to make 100% | wherein R is an alkali metal,
   II. sintering the body without substantially reducing the porosity,
   III. applying a temperature gradient to change continuously the pore distribution,
   IV. immersing the body into a penetrating medium, and V. heating the porous optical-glass body to a temperature of 550°–700° C to eliminate the pores and give a transparent optical glass body having an index of refraction gradient such that the part of the glass with a higher temperature has a lower index of refraction than the part of the glass with a lower temperature.

5. A process for producing a transparent optical-glass body having an index of refraction gradient, said process comprising the steps of:

I. pressing particles of optical glass to form a self-supporting porous body of optical glass of the following composition by weight percent:

| | |
|---|---|
| $SiO_2$ | 10 to 50 |
| $R_2O$ | 2 to 30 |
| $B_2O_3$ | 0 to 5 |
| $Al_2O_3$ | 0 to 5 |
| PbO | balance to make 100% | wherein R is an alkali metal,

II. leaching a first portion of the $R_2O$ from a first part of the porous body and leaching a second portion of the $R_2O$ from a second part of the porous optical-glass body, wherein the first portion $R_2O$ leached is greater than the second portion of $R_2O$ leached;

III. heating the porous optical-glass body to a temperature of 550° to 700° C to eliminate the pores and give a transparent optical-glass body having an index of refraction gradient such that the index of refraction is greater in the second part of the glass body than the index of refraction in the first part.

6. A process for producing a transparent optical-glass body having a linear index of refraction gradient, said process comprising the steps of:

I. pressing particles of optical glass of a size between 60 and 100 microns to form a self-supporting porous body of optical-glass of the following composition by weight:

| | |
|---|---|
| $SiO_2$ | 10 to 50 |
| $R_2O$ | 2 to 30 |
| $B_2O_3$ | 0 to 5 |
| $Al_2O_3$ | 0 to 5 |
| PbO | balance to make 100% | wherein R is an alkali metal

II. sintering the body at 600° C without substantially reducing the porosity,

III. immersing the porous optical-glass body into a aqueous leaching solution of $Na_2HPO_4$ and citric acid;

IV. changing the level of the leaching solution with respect to the porous optical-glass body thereby leaching a first portion of the $R_2O$ from a first part of the porous optical-glass body and leaching a second portion of the $R_2O$ from a second part of the porous optical-glass body and wherein the first portion of $R_2O$ leached;

V. heating the porous optical-glass body to a temperature of 550° to 700° C at a pressure less than $10^{-7}$ torr to eliminate the pores and give a transparent optical-glass body having an index of refraction gradient such that the index of refraction is greater in the second part of the glass body than the index of refraction in the first part.

* * * * *